United States Patent
Isachenkov et al.

(10) Patent No.: US 12,105,547 B2
(45) Date of Patent: Oct. 1, 2024

(54) BATTERY POWER SUPPLY CIRCUIT FOR MAXIMIZING UTILIZATION OF AVAILABLE BATTERY CAPACITY

(71) Applicant: Xsense Ltd., Migdal Tefen (IL)

(72) Inventors: Andrii Isachenkov, Migdal Tefen (IL); Robert Alexander Williams, Migdal Tefen (IL)

(73) Assignee: Xsense Ltd., Migdal Tefen (IL)

( * ) Notice: Subject to any disclaimer, the term of this patent is extended or adjusted under 35 U.S.C. 154(b) by 0 days.

(21) Appl. No.: 18/166,519

(22) Filed: Feb. 9, 2023

(65) Prior Publication Data
US 2024/0272663 A1 Aug. 15, 2024

(51) Int. Cl.
*G05F 1/565* (2006.01)
*H02J 7/00* (2006.01)
*H02J 7/34* (2006.01)

(52) U.S. Cl.
CPC ............ *G05F 1/565* (2013.01); *H02J 7/0013* (2013.01); *H02J 7/0063* (2013.01);
(Continued)

(58) Field of Classification Search
CPC ....... G05F 1/565; H02J 7/0013; H02J 7/0063; H02J 7/007182; H02J 7/345
(Continued)

(56) References Cited

U.S. PATENT DOCUMENTS

| 4,609,860 A | * | 9/1986 | Fasen | H02J 7/007182 |
| | | | | 320/113 |
| 5,223,780 A | * | 6/1993 | Hu | H01M 10/44 |
| | | | | 455/575.8 |

(Continued)

FOREIGN PATENT DOCUMENTS

| CN | 105007352 A | 10/2015 | |
| CN | 111129619 A * | 5/2020 | .......... H01M 10/425 |

(Continued)

OTHER PUBLICATIONS

Professional English Translation of CN113315375A, translated by USPTO translator Irina Knizhnik, Jul. 13, 2023 (Year: 2023).*

(Continued)

*Primary Examiner* — John T Trischler
(74) *Attorney, Agent, or Firm* — Nathan & Associates; Menachem Nathan

(57) ABSTRACT

A battery power supply to power an intermittently operating load includes a voltage downconverter configured to be serially connected to a battery and to output a voltage VOUT smaller than a battery voltage V1. A current limiter is serially connected to the voltage downconverter and is configured to provide a voltage drop in a current limiting mode, and to substantially provide a short circuit in a non-current limiting mode. The battery power supply additionally includes a capacitor tank serially connected to the current limiter for providing a voltage V2 to the load, and configured to be charged to a voltage VCT which is less than VOUT when the current limiter is switched to the current limiting mode. The capacitor tank is additionally configured to be charged to a voltage which is substantially equal to VOUT when the current limiter is switched to the non-current limiting mode.

26 Claims, 7 Drawing Sheets

(52) U.S. Cl.
CPC ........ *H02J 7/007182* (2020.01); *H02J 7/345* (2013.01); *H02J 2207/20* (2020.01); *H02J 2207/50* (2020.01)

(58) Field of Classification Search
USPC ...................................................... 320/135
See application file for complete search history.

(56) References Cited

U.S. PATENT DOCUMENTS

| | | | | |
|---|---|---|---|---|
| 5,587,250 | A * | 12/1996 | Thomas | H01G 9/00 429/3 |
| 5,591,212 | A * | 1/1997 | Keimel | A61N 1/378 607/5 |
| 6,259,234 | B1 * | 7/2001 | Perol | H02M 3/158 323/222 |
| 6,435,293 | B1 * | 8/2002 | Williams | B60H 1/00407 62/323.3 |
| 6,856,654 | B1 * | 2/2005 | Carkner | H04B 15/005 375/295 |
| 6,998,816 | B2 * | 2/2006 | Wieck | H02J 7/34 320/107 |
| 7,183,014 | B2 * | 2/2007 | Sasaki | H02J 7/345 429/61 |
| 7,531,995 | B2 * | 5/2009 | Hara | H02M 3/157 323/349 |
| 7,701,079 | B2 * | 4/2010 | O'Gorman | B60R 16/023 307/10.1 |
| 7,772,820 | B2 * | 8/2010 | Xia | H02M 3/156 323/282 |
| 7,782,027 | B2 * | 8/2010 | Williams | H02M 3/07 363/60 |
| 7,786,712 | B2 * | 8/2010 | Williams | H02M 3/1588 363/60 |
| 7,812,579 | B2 * | 10/2010 | Williams | H02M 3/07 363/60 |
| 8,159,083 | B2 * | 4/2012 | O'Gorman | H02J 1/14 307/10.1 |
| 8,278,781 | B2 * | 10/2012 | Yamashita | H02J 7/00308 320/112 |
| 8,384,367 | B2 * | 2/2013 | Murakami | H02M 3/156 323/225 |
| 8,390,258 | B2 * | 3/2013 | Yamashita | H01M 10/44 320/136 |
| 8,406,824 | B2 * | 3/2013 | Taniuchi | H02J 7/345 455/343.1 |
| 9,106,103 | B2 * | 8/2015 | Paulakonis | H02J 9/062 |
| 9,106,277 | B2 * | 8/2015 | Manor | H04B 1/04 |
| 9,503,558 | B1 * | 11/2016 | Krishnamurthi | H04M 1/0262 |
| 9,923,470 | B2 * | 3/2018 | Jimenez Pino | H02J 7/34 |
| 10,654,376 | B2 * | 5/2020 | Toriumi | H01M 8/04567 |
| 10,845,423 | B2 * | 11/2020 | Murasaki | G01R 31/396 |
| 11,527,781 | B2 | 12/2022 | Wigney | |
| 11,557,910 | B2 * | 1/2023 | van Sinderen | H02J 7/0063 |
| 11,647,571 | B2 * | 5/2023 | Zhou | H05B 45/10 315/291 |
| 2002/0014880 | A1 * | 2/2002 | McAndrews | H02J 9/061 320/134 |
| 2003/0180606 | A1 * | 9/2003 | Sasaki | H01M 6/5033 429/125 |
| 2004/0080892 | A1 * | 4/2004 | Popescu-Stanesti | H02J 7/0068 361/93.9 |
| 2004/0263124 | A1 * | 12/2004 | Wieck | G06F 1/263 320/128 |
| 2006/0028778 | A1 * | 2/2006 | O'Gorman | H02J 1/14 361/62 |
| 2006/0291512 | A1 * | 12/2006 | Borschowa | H01S 5/0683 372/38.07 |
| 2008/0054862 | A1 * | 3/2008 | Hara | H02M 3/157 323/234 |
| 2008/0157732 | A1 * | 7/2008 | Williams | H02M 3/07 323/266 |
| 2008/0157733 | A1 * | 7/2008 | Williams | H02M 3/1588 363/21.01 |
| 2008/0158915 | A1 | 7/2008 | Williams | |
| 2008/0213633 | A1 * | 9/2008 | Sasaki | H01M 6/50 429/7 |
| 2009/0085539 | A1 * | 4/2009 | Xia | H02M 3/156 323/234 |
| 2010/0013324 | A1 * | 1/2010 | Yamashita | H01M 10/44 307/125 |
| 2010/0120475 | A1 * | 5/2010 | Taniuchi | H02J 7/345 455/572 |
| 2010/0134078 | A1 * | 6/2010 | Murakami | H02M 3/156 323/271 |
| 2010/0194192 | A1 * | 8/2010 | O'Gorman | H02J 7/1438 307/9.1 |
| 2011/0244929 | A1 * | 10/2011 | Manor | H04B 1/04 455/572 |
| 2012/0146610 | A1 * | 6/2012 | Yamashita | H02J 7/00308 323/284 |
| 2012/0146616 | A1 * | 6/2012 | Yamashita | H01M 10/44 323/351 |
| 2012/0261984 | A1 * | 10/2012 | O'Gorman | B60R 16/023 307/10.1 |
| 2013/0076141 | A1 * | 3/2013 | Paulakonis | H02J 9/062 307/64 |
| 2013/0096539 | A1 * | 4/2013 | Wood | H02J 7/00 606/1 |
| 2013/0181659 | A1 * | 7/2013 | Chang | H01M 10/44 320/162 |
| 2014/0117934 | A1 * | 5/2014 | Kurikuma | H02J 7/007182 320/109 |
| 2015/0008867 | A1 * | 1/2015 | Smychkovich | H02J 7/00 320/137 |
| 2015/0137823 | A1 * | 5/2015 | Murasaki | G01R 31/389 324/426 |
| 2016/0013498 | A1 * | 1/2016 | Herring | H01M 6/06 429/206 |
| 2016/0360022 | A1 * | 12/2016 | Krishnamurthi | H04M 1/72409 |
| 2017/0237274 | A1 * | 8/2017 | Lazarev | H02J 3/28 320/166 |
| 2017/0294847 | A1 * | 10/2017 | Xie | H02M 7/487 |
| 2017/0317516 | A1 | 11/2017 | Stern | |
| 2018/0248525 | A1 * | 8/2018 | Orr | H02M 3/1582 |
| 2019/0193589 | A1 * | 6/2019 | Toriumi | B60L 58/40 |
| 2019/0326763 | A1 * | 10/2019 | Wilhide | B60L 58/22 |
| 2021/0098124 | A1 * | 4/2021 | Crook | H02J 7/0048 |
| 2021/0135473 | A1 * | 5/2021 | Wigney | H01M 10/48 |
| 2021/0188100 | A1 * | 6/2021 | Yoshida | B60L 50/13 |
| 2021/0336452 | A1 * | 10/2021 | Wu | H02J 7/345 |
| 2022/0159804 | A1 * | 5/2022 | Zhou | H05B 45/10 |
| 2022/0200308 | A1 * | 6/2022 | van Sinderen | H02J 7/0063 |
| 2022/0302848 | A1 * | 9/2022 | Yu | H02M 1/36 |

FOREIGN PATENT DOCUMENTS

| | | | | |
|---|---|---|---|---|
| CN | 112977176 | A * | 6/2021 | ........... B60L 3/0053 |
| CN | 113315375 | A * | 8/2021 | |
| CN | 113437775 | A * | 9/2021 | |
| JP | 4761209 | B2 * | 8/2011 | |
| WO | 2011015900 | A1 | 2/2011 | |

OTHER PUBLICATIONS

""1.5A, Low-Noise, 1MHz, Step-Up DC-DC Converter" by MAXIM, 19-1698; Rev 2; 4/11".
"Linear Technology "Tiny Synchronous Step-Up Converter Starts Up at 700mV ", Design Note 428, by Dave Salerno".
"LTC3526L/LTC3526LB datasheet of 550mA 1MHz Synchronous Step-Up DC/DC Converters in 2mm+2mm DFN".
Steve Pietkiewicz"Micropower 600kHz Fixed-Frequency DC/DC Converters Step Up from a 1-Cell or 2-Cell Batter", Linear Technology Magazine, Feb. 1998, pp. 8-10.
""TPS80010 PMU for Alkaline Battery-Powered Applications", SLVSAD1B—Jun. 2010—Revised Jan. 2016, Texas Instruments".

(56) References Cited

OTHER PUBLICATIONS

International Search Report and Written Opinion for International Application No. PCT/IB2024/051219, mailed Jun. 17, 2024, 12 Pages.

* cited by examiner

BATTERY POWER SUPPLY CIRCUIT FOR MAXIMIZING UTILIZATION OF AVAILABLE BATTERY CAPACITY

TECHNICAL FIELD

The present disclosure relates to an apparatus and methods of powering electronic devices with batteries.

BACKGROUND

Many different types of electronic devices may impose particular demands on their power supplies. Lithium and lithium-ion batteries are frequently used in the power supplies of these devices. Traditional lithium-chemistry based batteries generally have a flat discharge curve and very low internal resistance. This makes them advantageous for use in applications with relatively high power requirements, such as in cellular modems, RF transceivers, IoT (Internet of Things) devices, etc., compared with batteries having non-flat discharge curves and high internal resistance, for example, alkaline batteries and other non-lithium batteries. Consequently, the latter types of batteries may have more limited utilization in electronic devices.

BRIEF DESCRIPTION OF THE DRAWINGS

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The number of elements shown in the Figures should by no means be construed as limiting and is for illustrative purposes only. The figures are listed below.

DETAILED DESCRIPTION

Figure 1:
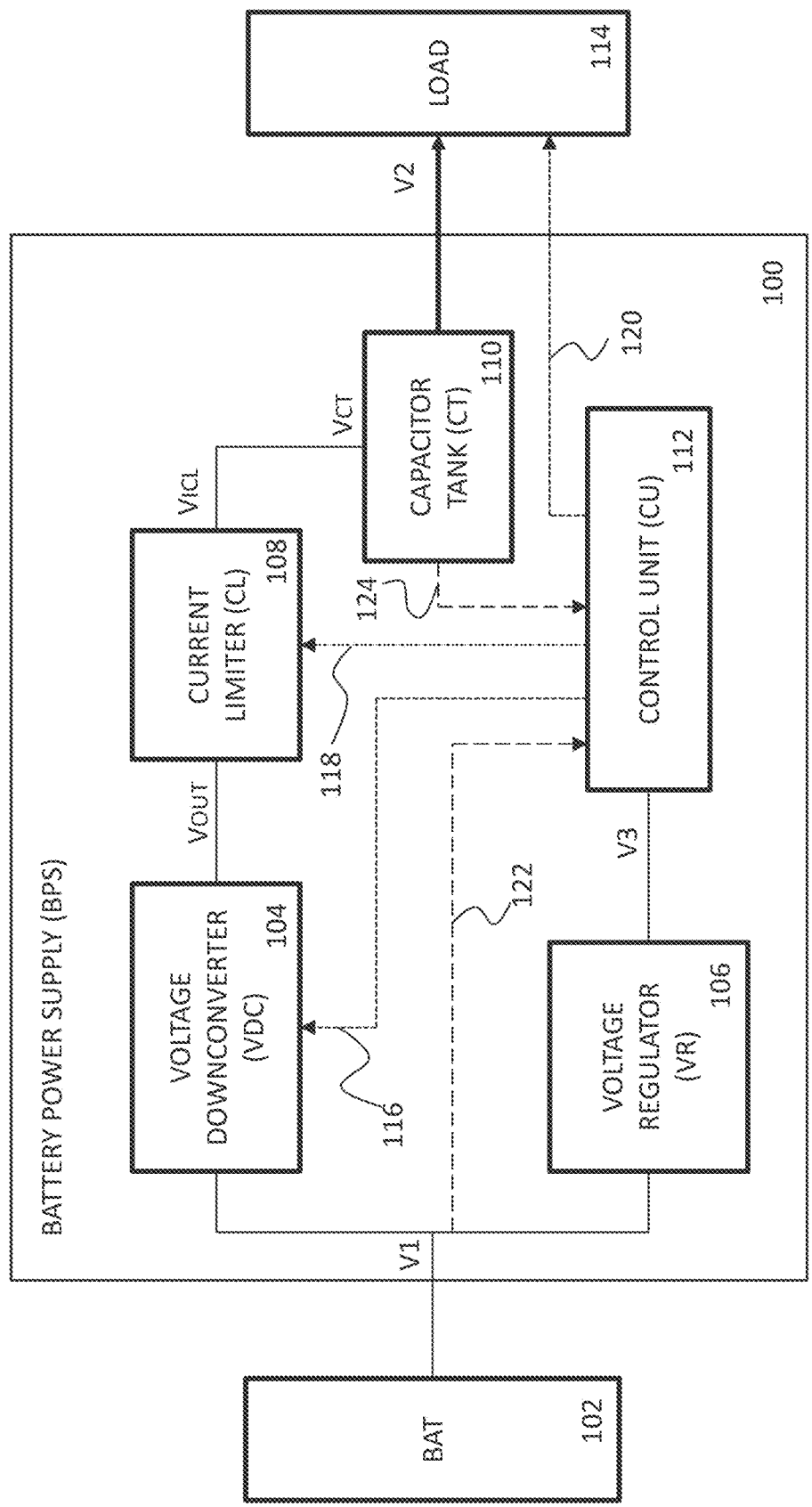
FIG. 1 which is a schematic functional diagram of an exemplary battery power supply (BPS), according to an embodiment of the present invention.

Applicants have realized that use of lithium and lithium-ion batteries in IoT devices and other relatively high power consumption devices, may include a number of drawbacks as these types of batteries are hazardous, restricted in transportation and usage, and expensive. Consequently, Applicants have realized that there is a need for an apparatus and for methods to power a wide class of IoT devices and other relatively high power consumption devices without degrading their critical operational characteristics, and which employ batteries such as alkaline batteries and other batteries which have widespread availability and are devoid of the disadvantages of lithium-chemistry batteries. Such an apparatus, or "battery power supply" as referred to hereinafter, in some embodiments, may be suitable for use with any type of "periodic switching" or "on and off" device or any device with different load current profiles in different states. Examples of such devices may include cellular 2G/3G/4G/5G modems, RF transceivers, and sensors, among others.

An aspect of the present invention relates to a battery power supply (BPS) including electronic circuitry configured to be connected to one or more batteries (hereinafter "battery") possessing non-flat discharge curves and high internal resistance, optionally non-linear, and to replicate the output characteristics of a power source possessing a battery with a flat discharge curve and low internal resistance (i.e. lithium battery). The electronic circuitry may include analog components, digital components, and control logic configured to adjust the operating parameters of the BPS to maintain its stability over a wide temperature range, optionally when connected to intermittently operating loads. The electronic circuitry may include a voltage downconverter, pre-charging circuitry including a current limiter, storage capacitors having large-value capacitance and low output impedance, a voltage regulator, and a control unit (controller) to control the electronic circuitry providing different consumption currents to the intermittently operating loads. Optionally, the battery and/or the load may be included in the BPS. Optionally, the loads may include intermittently operating IoT devices and other relatively high power switching loads.

In some embodiments, the electronic circuitry may include two states of operation. A first state where the load may be in unpowered mode, optionally in a low power consumption mode, (which may also be referred to hereinafter as "unpowered mode" or "unpowered state"), and a second state where the load is in a relatively high-power consumption mode (which may also be referred to hereinafter as "powered mode" or "powered state"). In the first state, initially, the voltage downconverter may be set to an off mode associated with a disabled state of the downconverter, and the current limiter may be set to a current limiting state by the controller. In this first state, the storage capacitor may be essentially disconnected from the battery. When the load is to be switched into the powered mode, the controller may first set the voltage downconverter to an on mode associated with an enabled state in the downconverter to apply an initial voltage through the current limiter on the storage capacitor to increase its charge. The controller, upon sensing the voltage on the capacitor and allowing for a first charging period, may disconnect the current limiter (i.e. causing a short circuit or shunting the circuit with a resistance that is less than the resistance of the circuit) to further increase the voltage on the storage capacitor and initiate a second charging period. The second charging period may be followed by a period of stabilization. Upon sensing the increased voltage and following the aforementioned optional period of stabilization, the controller may then turn on the load in the powered mode to draw high power current from the charged storage capacitor.

In some embodiments, the electronic circuitry may provide for protection of the battery against large current impulses and large inrush currents, and from battery drain by eliminating parasitic self-discharge currents of the storage capacitors while the load is turned off. The electronic circuitry may provide a first current surge to a limited (controlled) value in the process of turning on the load, followed by a gradual decrease in current when the storage capacitors are first charged. The electronic circuitry may then provide a second short current surge to a limited (controlled) value when current limiting is disconnected, followed by a relatively long stabilization (relaxation) period with a stable small (optionally milliamps range) discharge current, and then the full current when the load is powered on.

It may be appreciated that there are several advantageous features to the BPS of the present invention, in addition to serving to provide power to devices typically using batteries with flat discharge curves and a low internal resistance. The specific discharge profile formed by the first regulated surge to a controlled value with decreasing current, followed by a second short surge to a controlled value, followed by a subsequent low discharge current during stabilization, is well suited to the ions activity specific that is the basis of alkaline (and other) chemistry batteries. Additionally, the electronic circuitry may allow for estimating the state of the battery based upon its internal resistance. For example, a dual pulse test may be used and may include as input the battery voltage and current (which may be calculated from available data about circuitry implementation and voltage measurement results) at the end of the first charging period, and at the end of the second charging period following the stabilization (relaxation). Furthermore, the electronic circuitry may be used as an in-circuit capacitor meter for the testing of the storage capacitors. Furthermore, it may allow for self-adaptation to environmental conditions, for example, to temperature variations. It is noted that aluminum electrolytic capacitors with a low temperature rating of −55° C. generally exhibit a capacitance loss of between −10% and −20% when operating at −40° ° C. As the temperature decreases, the pre-charge current required by the storage capacitors decreases, and consequently, the battery may be less stressed despite its high internal resistance.

In some embodiments, time-series data from periodical voltage measurements of the storage capacitors by the controller may be stored (e.g., in the controller) for use in a production testing stage (to estimate the real capacity of the storage capacitors which may serve as an indication of the quality of the assembly), or in runtime to check its real state (which may be useful and important for devices with an operational life possibly reaching or exceeding that of the electrolytic capacitors). This time-series data may be used locally by the device, or may be transmitted over communication channels from the device for use by remote services or applications. It is noted that, if the capacitance may be varied, the data may serve to adjust the capacitance accordingly.

In some embodiments, the BPS of the present invention may be integral to the device, with the battery built-in in the BPS or, alternatively, the battery may be separately replaceable. Optionally, the BPS may be a kit which may be adapted to existing devices, for example, through retrofit. It is noted that, although the BPS of the present invention is described herein as being operational with batteries possessing non-flat discharge curves and high internal resistance, optionally non-linear, the skilled person may readily appreciate that the BPS may also be used with batteries which have flat discharge curves, for example, lithium and lithium-ion batteries, and therefore its application is not limited to non-flat discharge curve batteries.

Reference is now made to FIG. 1 which is a schematic functional diagram of an exemplary battery power supply (BPS) 100, according to an embodiment of the present invention. BPS 100 is configured to supply DC power from a battery (BAT) 102 having a non-flat discharge curve and a high internal resistance, generally associated with alkaline batteries and other types of non-lithium-chemistry batteries, or may have other discharge characteristics and/or other internal resistance characteristics, such as lithium or lithium-ion batteries and other types of batteries, to a load (LOAD) 114. Optionally, LOAD 114 may be an IoT device or other relatively high power consuming device generally powered by a lithium battery. Operational modes of LOAD 114 may include periodic switching, optionally ON/OFF states, and/or different load current profiles in different states. BPS 100 includes a voltage downconverter (VD) 104, a voltage regulator (VR) 106, a current limiter (CL) 108, a capacitor tank (CT) 110, and a control unit (CU) 112. Optionally, BAT 102 and/or LOAD 114 may be included in BPS 100

BAT 102 may include a plurality of batteries serially connected so that an output voltage V1 of the battery pack is generally greater than a voltage V2 required by LOAD 114. As previously mentioned, BAT 102 may include batteries with a non-flat discharge curve and with a relatively high internal resistance, for example, alkaline batteries, and also batteries with other discharge curve and/or other internal resistance, such as, for example, lithium metal, lithium-ion, or nickel-metal hydride (NiMH) batteries, among others. Alternatively, BAT 102 may be a single battery.

VDC 104 may include a voltage downconverter (e.g., buck converter) which down-converts voltage V1 to a voltage VOUT and is configured to be turned on (enabled) and off (disabled) by CU 112, as will be described later on. Voltage VOUT may be of a lesser voltage than V1 and greater than or equal to V2.

Figure 2:
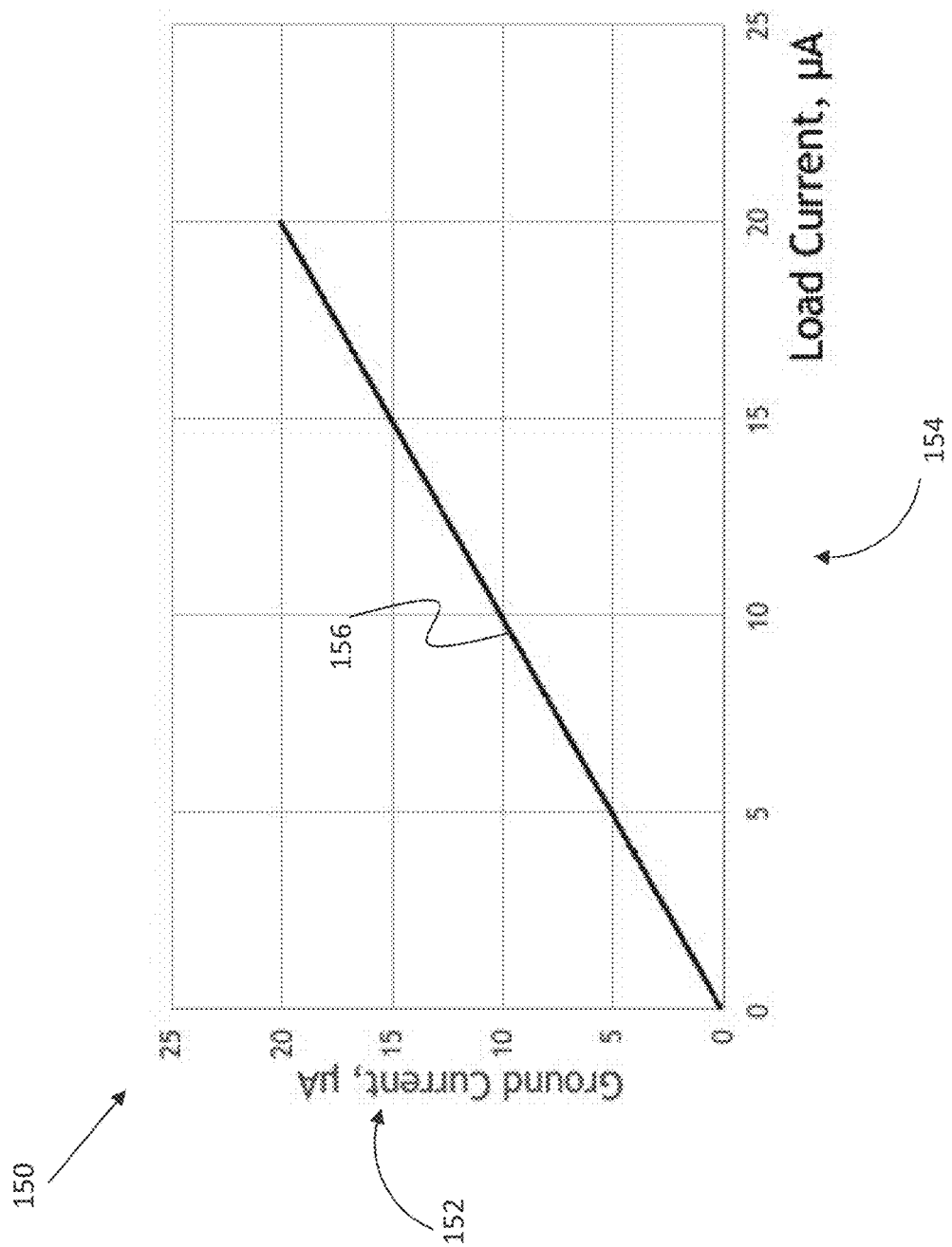
FIG. 2 is a graph showing an exemplary linear characteristic of the ground current in the voltage regulator in FIG. 1, according to an embodiment of the present invention.

VR 106 may include a low current voltage regulator which may output a constant voltage V3 as power source for CU 112, voltage V3 optionally being less than or equal to V2. During "sleep" periods of CU 112, VR 106 output current, as an example, may be equal to or less than 10 microamperes. VR 106 may include a low voltage drop linear regulator with a wide input voltage range and low ground current which may be linearly dependent on the load current, optionally in the microcurrent region. For exemplary purposes, FIG. 2 is a graph 150 showing an exemplary linear characteristic of the ground current in VR 106, although it is noted that graph 150 may vary according to the type of voltage regulator which is used. Graph 150 plots ground current in microamperes along the Y-axis 152, and load current in microamperes along the X-axis 154. The linear dependency is shown by line 156 which reflects an increase in the ground current as the load current increases. It is noted that, alternatively, VR 106 may include use of a switching regulator.

CL 108 may include any type of current limiting circuit which may be controlled by CU 112 to optionally either set the current limiting to a predetermined level, or to disconnect the current limiting (short circuit state so that there is essentially no limiting of the current flowing through CL 108). The current limiting predetermined level may be optionally determined by the capacity of the capacitive tank, by the specific chemistry of the batteries used, and/or according to the implementation, and may be in the range of tens or hundreds of milliamps. CT 110 may be any type of capacitor, optionally a plurality of parallel-connected capacitors, with a low equivalent series resistance (ESR) and rated for voltage greater than or equal to V2, and with a capacitance large enough for feeding relatively large, short current consumption surges demanded by LOAD 114. LOAD 114, as previously mentioned, may be an IoT device or other relatively high power consuming device generally powered by, but not limited to, a lithium battery, for example, any cellular 2G/3G/4G/5G or other modem, an RF transceiver, a sensor, among many others.

It is noted that the selection of CT 110 may be determined by the specific consumption profile of LOAD 114, and the capacity of the capacitor tank CT 110 may be based on the characteristics of BAT 102. BAT 102 protection from inrush current may be provided by CL 108 when VDC 104 is turned on and CT 110 is completely discharged. Furthermore, BAT 102 protection may be provided from CT 110 self-discharge current when VDC 104 is turned off. Therefore, use of CT 110 with a capacity of thousands of microfarads to units of farads, and self-discharge current at levels of milliamps or more, may be possible.

CU 112 may be a part of any device that uses this BPS 100 power system or may be a specific part of BPS 100. CU 112 may include any processor-based device, and may include any combination of hardware, software, and firmware. CU 112 may measure voltage V1 of BAT 102 through a monitoring signal 122, and voltage VCT at CT 110 through a monitoring signal 124. CU 112 may control operation, including enabling of VDC 104 through a control signal 116, and may additionally control operation of CL 108 through a control signal 118 in order to set the current limiter to the predetermined current limiting level or to none at all. Additionally, CU 112 may control operation of LOAD 114 through control signal 120 in order to turn the load on and off. It is noted that the monitoring signals 122 and 124, and the control signals 116, 118, and 120, may be implemented using any one, or combination of, analog and digital signals, including appropriate circuitry, including transmission buses as required.

CU 112 may implement the required feedback to maintain BPS operation despite temperature variations and component tolerance variations. CU 112 may additionally adjust operating parameters based on the type and requirements of LOAD 114, and/or battery charge level. CU 112 may use monitoring signal 124 to measure voltage V2 of CT 110, and, responsively, may control the operation of VDC 104 and CL 108 by means of control signal 116 and control signal 118, respectively. CU 112 may use monitoring signal 122 to measure the voltage V1 of BAT 102 and monitoring signal 124 to measure the voltage V2 of CT 110, and by controlling the operation of CL 108 with control signal 118, may determine the battery charge level by indirectly measuring the internal resistance of the battery.

Figure 3:
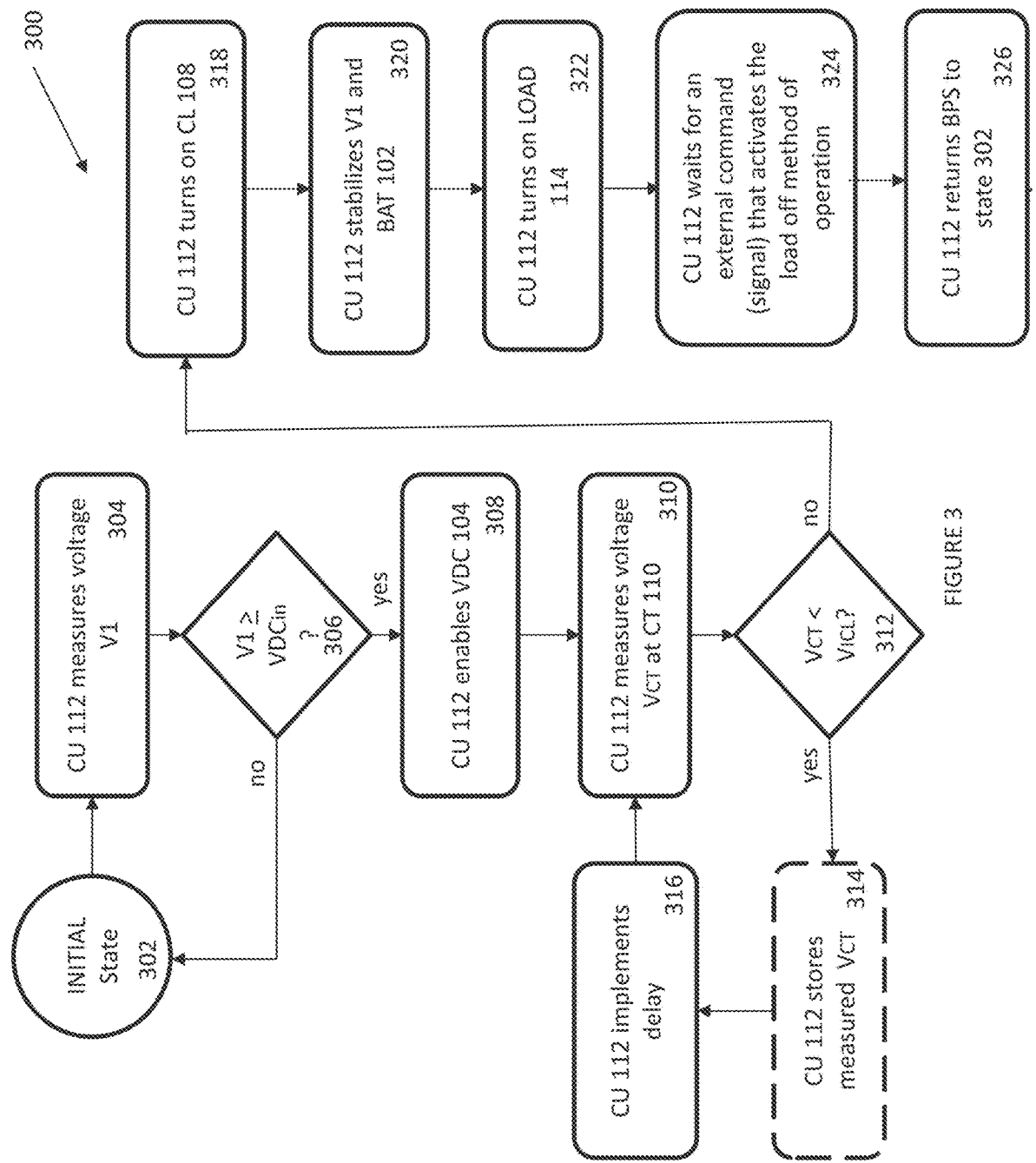
FIG. 3 is an exemplary flow chart describing a method of operation of the BPS when powering an intermittently operating (switching) device, optionally when switching the load between an unpowered state, optionally low powered, and a powered state, according to an embodiment of the present invention.

Reference is now made to FIG. 3 which is an exemplary flow chart 300 describing a method of operation of the BPS when powering an intermittently operating (switching) device, according to an embodiment of the present invention. For ease in understanding, flow chart 300 is described with reference to BPS 100 in FIG. 1, and to the components therein.

At 302, BPS 100 may be in an initial state. VDC 104 may be turned off (disabled, CL 108 may be in current limiting mode (at a predetermined current limiting level), CT 110 may be discharged, VR 106 may be in an always-ON state so that it is continuously operational and supplies power to CU 112, and LOAD 114, may be in an unpowered state.

At 304, CU 112 may measure voltage V1 through monitoring signal 122. CU 112 may be configured to measure the voltage V1 at predetermined intervals of time, or continuously.

At 306, CU 112 may determine if the measured voltage V1 exceeds a minimum input voltage VDCin required by VDC 104 (i.e. if the battery voltage under light load is sufficient to start the voltage downconverter). If not, return to step 302. It is noted that as part of returning to step 302, troubleshooting efforts may be made to determine whether BAT 102 may be faulty (or drained).

At 308, responsive to a determination that the voltage V1>VDCin, CU 112 may turn on VDC 104 by means of control signal 116 which may serve as an enable signal. The input signal is enabled at a time sufficiently in advance of expected operation of the LOAD 114, such that the CT 110 may be sufficiently charged to power the LOAD 114. VDC 104 may output a voltage VOUT which may be applied to CL 108. It may be noted that CL 108, from step 302, may be in a current limiting mode, and together with the real capacity of CT 110, may dictate the time constant (delay) required to charge the capacitor tank to a voltage VCT=VICL. It may be further noted that there may be a threshold voltage value VICL which is determined by a method of operation of BPS at step 312 and may be less than $V_{OUT}$. An exemplary charging curve of CT 110 is described further on below with reference to FIG. 4, where VICL voltage level is referred as dotted line 410. Based on the above, it may be appreciated that the following voltage relationship may be present in the BPS, V1>VOUT>VICL.

At 310, following activation of VDC 104, CU 112 may repeatedly measure the voltage VCT at CT 110 periodically, or, alternatively, continuously. The measuring may be done by means of monitoring signal 124 and may be performed in conjunction with step 308.

At 312, CU 112 may compare each measurement of the voltage VCT with the voltage VICL. VICL may be an expected threshold voltage value to be attained while CL 108 current limiter is enabled. VICL may be less than $V_{OUT}$. If VCT<VICL, threshold voltage has not been reached, go to optional 314, or directly to 316. If VCT>=VICL, go to 318.

At optional 314, CU 112 may store each measurement of the voltage VCT for later use in a production testing stage, as is described further on below.

At 316, CU 112 may implement a delay which may be less than that introduced by the RC combination of the resistance in CL 108 and CT 110. The amount of this delay may be determined based on the time-constant of CL 108 and CT 110, and an allowable error in detecting voltage equality across the CT 110 and the threshold VICL. For example, if an error of 0.1V in comparison VCT≥VICL is acceptable, and based on the given time constant of CL 108 and CT 110 it is known that the minimum time to charge the CT 110 by 0.1V can be Tmin; the specified delay may be set to Tmin.

At 318, responsive to CU 112 measuring through monitoring signal that VCT≥ VICL, the control unit, through control signal 118, may enable CL 108 (removal of current limiting, short circuit state). The voltage VCT may increase and may approximate VOUT (not equal to as there is a finite resistance in any possible implementation of CL 108 despite the theoretical short circuit). It is noted that it may not be necessary for CT 110 to be fully charged at this point, and that the additional charging may be provided by the surge current due to the short circuit in CL 108.

At 320, in response to the expected jump in VCT following the enabling of CL 108 at 318, CU 112 may implement a delay to allow for the stabilization of both VCT and the ions of BAT 102. In practical implementations, the value of this stabilization delay may be tens of milliseconds, and may be optimized in a practical way based on experiments using batteries of the required chemistry.

At 322, following the optional stabilization delay, CU 112, the control unit may activate control signal 120 to activate (enable, turn on) LOAD 114. LOAD 114, with V2 applied to its input, may draw the necessary current required for operation from the charged capacitor tank CT 110 and VDC 104 output.

At 324, LOAD 114 may remain in an activated state (enabled, turned on) until CU 112 via control line 120 deactivates (disables, turns off) LOAD 114. CU 112 may optionally wait for and may receive an external command (signal) that causes the CU 112 to deactivate LOAD 114. While LOAD 114 is operating, it is powered by CT 110. CU 112 may maintain the states of the control outputs while waiting for the external command (signal) to deactivate the load.

At 326, the BPS may return to step 302 whereby the states of the components of the BPS are reinitialized.

Flow chart 300 is shown including steps 302 through 326. It is noted that steps 302 through 326 may be repeated for every operation which may require switching the operation of the LOAD 114 between an unpowered state and a powered state. It is further noted that the skilled person may practice the teachings of the method described by flow chart 300 using more or less steps, and/or a different sequence of steps.

It is noted that, during the operation of the BPS 100, BAT 102 may experience a number of variable conditions. Initially, when CT 110 begins to charge, BAT 102 may first see a relatively sharp surge of current, the amplitude of which may be determined by the value of the resistance in CL 108, by the real capacitance of CT 110, by the remaining charge of the storage capacitor tank 110 (if the capacitors are not fully discharged), and by the ratio of V1 and VOUT. BAT 102 may experience a strong discharge current that decreases over the charging cycle with CL 108 in the current limiting mode. When CL 108 is disconnected (current limiting is removed), BAT 102 may experience a second sharp surge of current. Following the surge, the battery stabilization (relaxation) period may be initiated. During this period, the battery discharge current may be small yet may be greater than at step 302, as it may be equal to a sum of the CU 112 work current, the parasitic current drawn by LOAD 114 in an off-state, the self-discharge current of CT 110, the current drawn by VR 106 in the on-state, and the current drawn by VDC 104.

In some embodiments, BPS 100, turning off powering of LOAD 114 may be initiated by transfer of control to a subroutine executable by CU 112. The CU 112 may power off the LOAD 114 and then disable VDC 104 in sequence without delay or with the necessary delay if the LOAD 114 requires it. As a result, CT 110 capacitor tank may be disconnected from the battery BAT 102 and its leakage current does not discharge the battery BAT 102.

Figure 4:
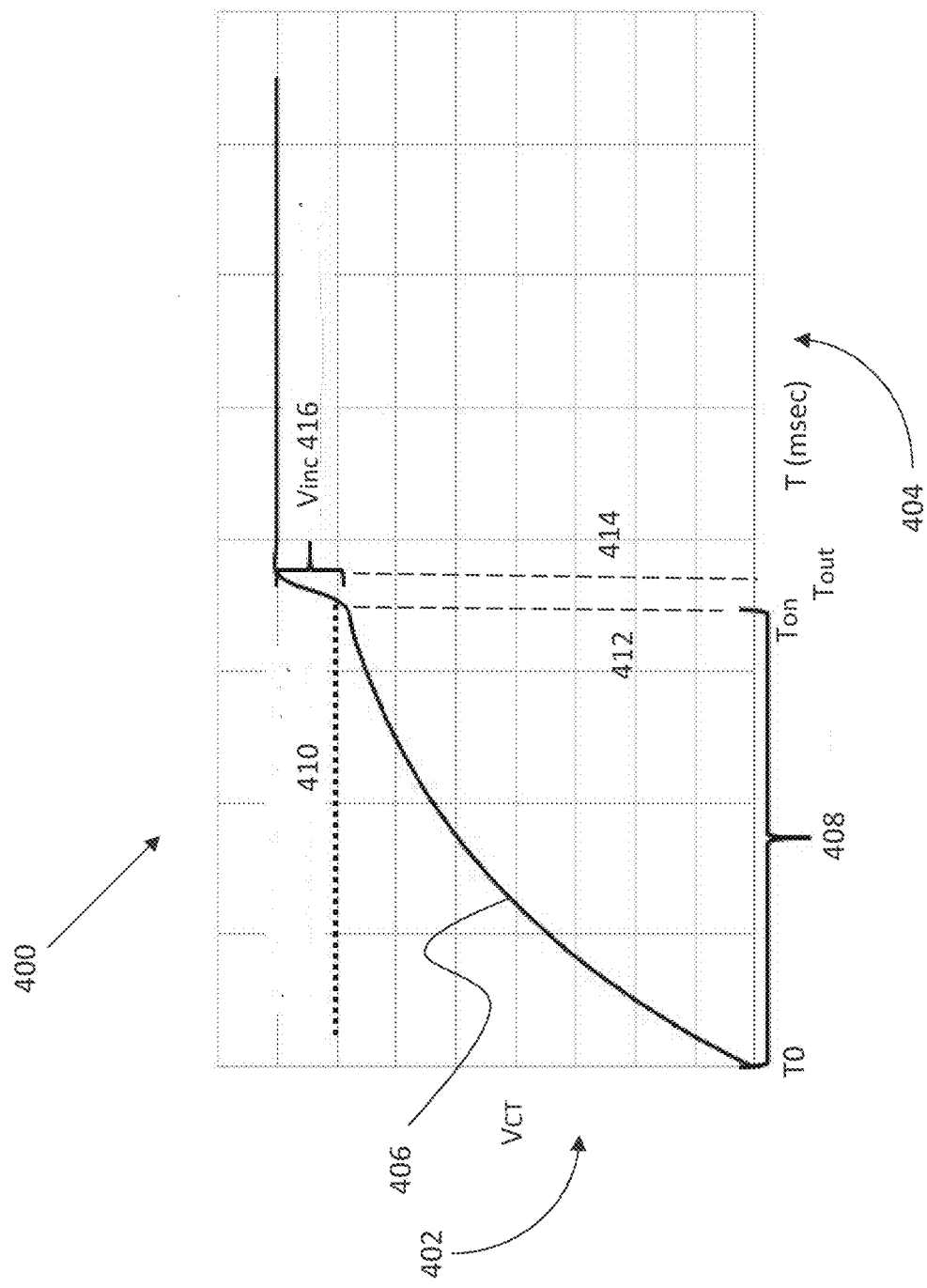
FIG. 4 is a graph of an exemplary charging curve of the capacitor tank voltage, optionally when operating per the method shown in the flow chart of FIG. 3, according to an embodiment of the present invention.

Reference is now made to FIG. 4 which is a graph 400 of an exemplary charging curve of CT 110, optionally when operating per method 300, according to an embodiment of the present invention. Graph 400 plots VCT on y-axis 402 vs. T (time in msec) on x-axis 404. As shown, CT 110 charging curve 406 may rise exponentially from VCT=0 at T=T0 (VDC 104 is turned on and outputs VOUT) to VCT=VICL 410 at T=Ton 412, the time constant dictated by the resistance in CL 108 and the capacitance of CT 110. At Ton 412, due to the removal of the current limiting, VCT increases to approximate $V_{OUT}$ at time T=TOUT 414, the increase shown by Vinc 416, with VCT=VICL 418 at T=Tout.

Figure 5:
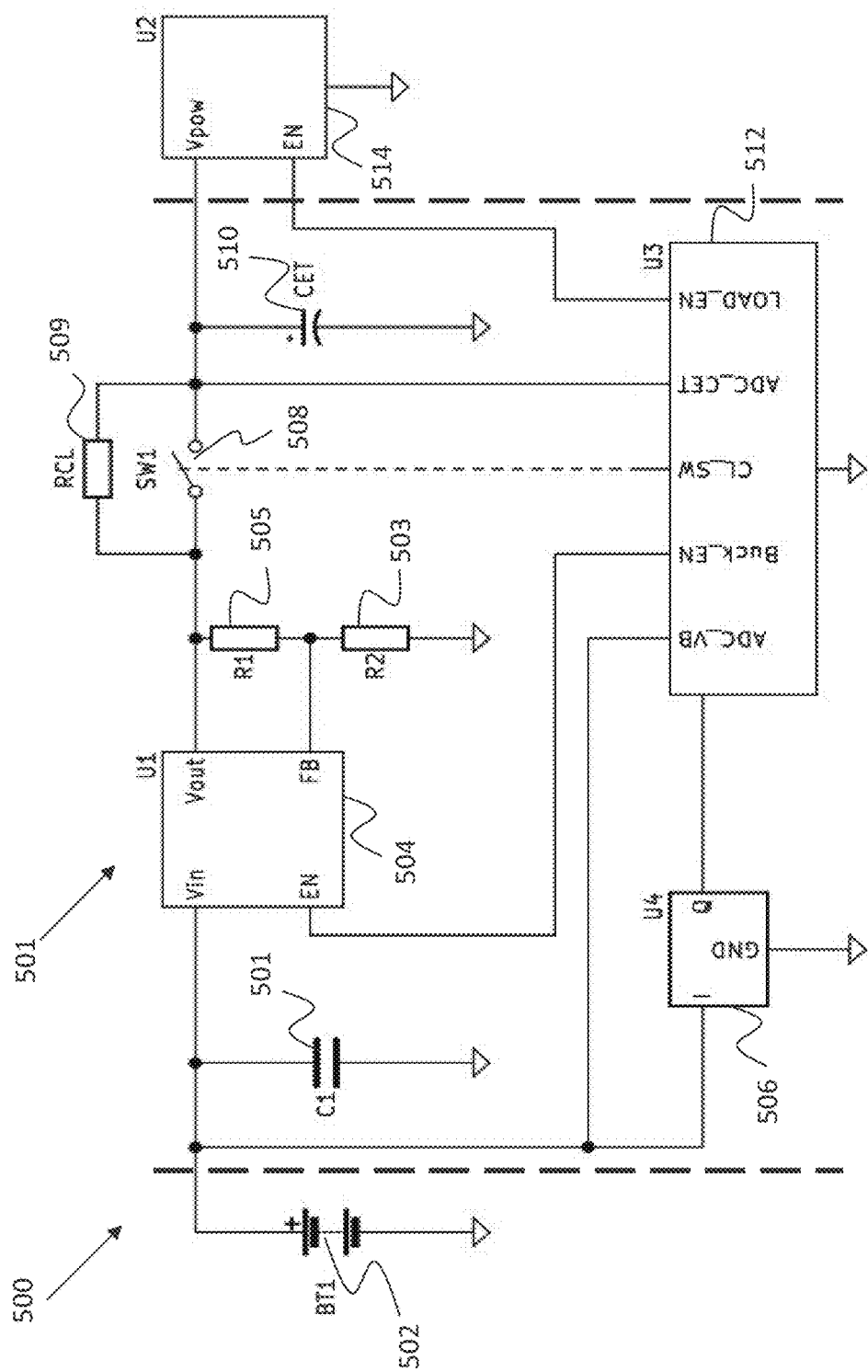
FIG. 5 is a simplified, electrical schematic diagram of an exemplary system, optionally an IoT system or other type of high power consumption, intermittently operating system, including a BPS, according to an embodiment of the present invention.

Reference is now made to FIG. 5 which is a simplified, electrical schematic diagram of an exemplary system 500, optionally an IoT system or other type of relatively high power consumption, intermittently operating system, including a BPS 501, according to an embodiment of the present invention. System 500 may additionally include a non-flat discharge, high internal resistance multi-cell battery BT1 502, and a connected load U2 512. Alternatively, BT1 502 may include one or more batteries with flat-discharge curve characteristics, for example, but not limited to lithium batteries or lithium-ion batteries. Optionally, BPS 501, BT1 502 and U2 512 may be functionally similar to BPS 100, BAT 102, and LOAD 114, in FIG. 1.

U1 504 with feedback resistors R1 505 and R2 503 may be any typical high-speed buck DC/DC converter implementing VDC 104 (non-essential implementation details are omitted). R1 505 and R2 503 analog feedback circuit may be used to assess the performance of U1 504 by periodical or real-time (based on comparators) measuring of the FB voltage of U1 by controller U3 512. During normal operation of U1 504, the FB voltage may be equal to the voltage of the internal reference voltage source of U1 known from the manufacturer's documentation, which may be used to check the U1 operability. U1 may not only serve as a voltage downconverter, but also as a controlled switch with enable/disable states controlled by Buck_EN signal of U3 512 (control signal 116 in FIG. 1).

U4 506 may implement VR 106 in FIG. 1 and may include an LDO (low-dropout regulator). SW1 508 and RCL 509 may implement CL 108 in FIG. 1. SW1 508 may be implemented using any electronically controlled switch, for example, a P-MOSFET, with a low resistance in the closed state. SW1 508 may be controlled by CL_SW signal (control signal 118 in FIG. 1). RCL 509 may be a current limiting resistor. In combination with U1 504 and a capacitor tank CET 510 (CT 110 in FIG. 1), the current limiter circuit may form a capacitor pre-charge system where U1, and SW1 508 may form a two-switch serial combination. It is noted that RCL 509 together with feedback resistors R1 505 and R2 503 may serve as a "bleeder" circuit for CET 510 when U1 is disabled.

U2 514 may be any possible intermittently activated load with an EN (enable) control signal input which may allow to turn it on or off (LOAD 114 in FIG. 1). U3 512 may be any controller suitable to control the operation of BPS 501, as described herein below, and as previously described with reference to the operation of BPS 100 and CU 112 in FIG. 1.

It is noted that Vin and Vout in U1 504 correspond with V1 and Vout in FIG. 1, respectively. Additionally, I and Q in U4 504 correspond with V1 and V3 in FIG. 1, respectively.

Furthermore, ADC_CET corresponds with VCT in FIG. 1 and Vpow with V2 in FIG. 1.

The following is a description of an exemplary operation of system 500, in accordance with an embodiment of the present invention. The description may reflect some or all of the steps shown in flow chart 300 in FIG. 3. It is noted that, as described in flow chart 300, U1 504 is in disabled state, SW1 508 is open (RCL 509 provides current limiting), and U4 506 is activated (continuously on).

In order to turn on U2 514, controller U3 first enables U1 504. After successfully enabling U1 504, U3 ADC_CET provides periodical measurements (or sampling) of the voltage VCT on the capacitor tank CET 510. As SW1 is in the open state, capacitor tank CET 510 is charged through resistor RCL 509. When VCT>VICL, U3 CL_SW closes SW1 508, short circuiting RCL 509 and increasing the voltage VCT, approximating VOUT. After the stabilization delay, U3 512 activates LOAD_EN to enable U2 514.

Figure 6:
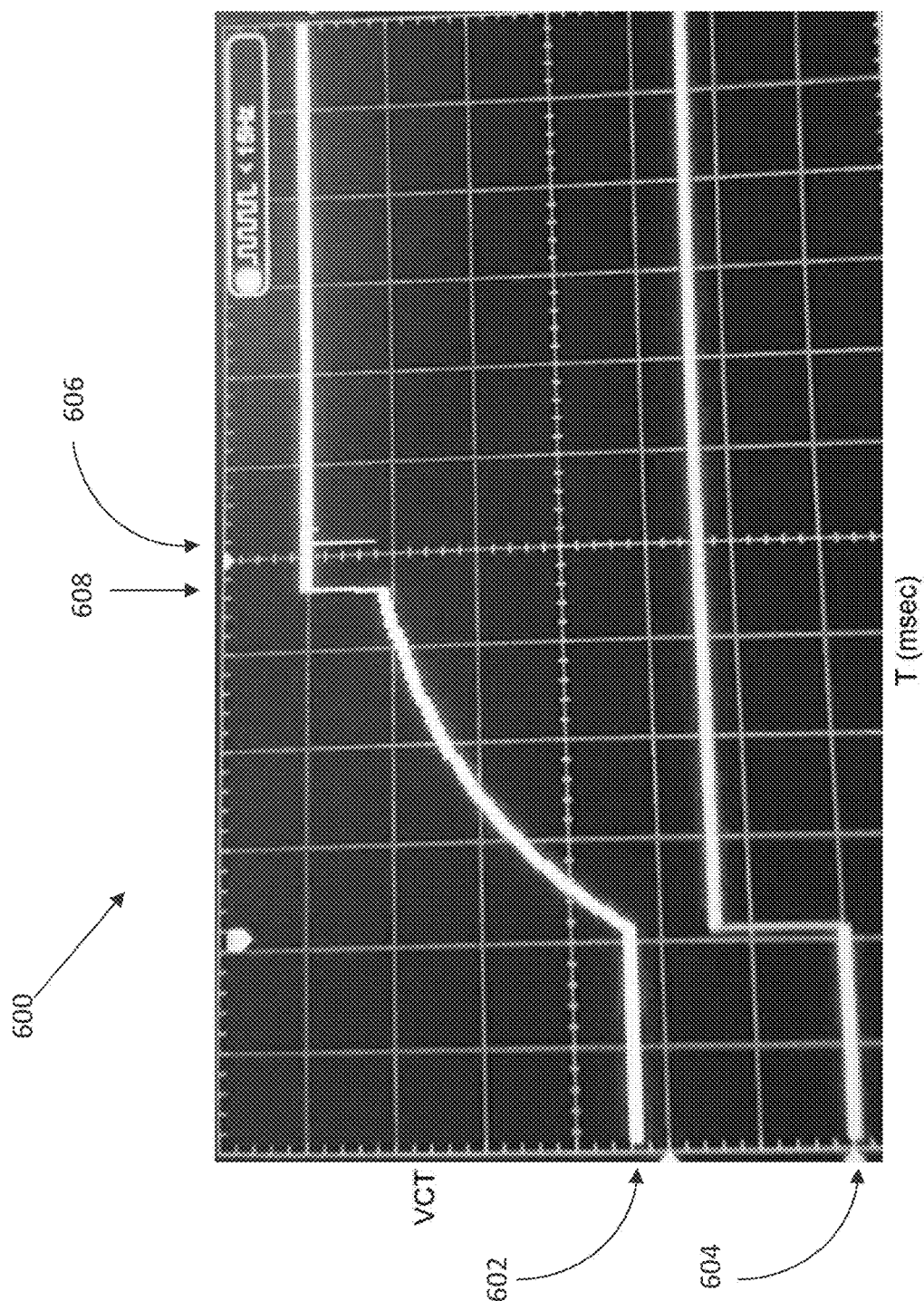
FIG. 6 shows an actual, real-time measurement graph of voltage across capacity tank in the BPS of FIG. 5 on an oscilloscope, according to an embodiment of the present invention.

Reference is now made to FIG. 6 which shows an actual, real-time measurement graph 600 of VCT in BPS 501 on an oscilloscope, according to an embodiment of the present invention. A top waveform 602 is the voltage on capacitor tank CET 510, and a bottom waveform 604 is the Buck_EN control signal. The short needle-like negative voltage drop 606 across the capacitor tank CET is a visible reaction to the load being turned on (by the LOAD_EN signal). A time interval between the controllable inrush battery current spike 608 (or voltage across capacitor tank CET) and the first needle voltage drop 606 is the battery relaxation period.

As earlier discussed, the electronic circuitry may be used for estimating the internal resistance of the battery by applying the dual pulse method. Referring back to FIG. 4 and to FIG. 5, at time Ton switch SW1 508 may be in the open state and capacitor tank CET 510 may be charging through resistor RCL 509. As U1 504 is a voltage source, its output voltage Vout may be independent from the load current (in normal operation range). Additionally, the voltage VCT on capacitor tank CET 510 may be measured so that a voltage drop across resistor RCL 509 may be determined (Vout-VCT). As the resistance of RCL 509 is known, the current through the resistor may be calculated by U3. As the U1 conversion factor N (Vin/Vout) (optionally may be set by resistors R1 and R2) the battery current at moment Ton may be calculated by U3 as IBT1=IRCL/N. Following closure of switch SW1 508, the pre-charged voltage on capacitor tank CET 510 at time Ton may be known, and the voltage VCT at time Tout, which should be substantially equal to U1 Vout (there may be a slight voltage drop across SW1 508), may also be known. As the capacitance of capacitor tank CET 510 may be known by design or it may be estimated in real time using available information (as previously described), the inrush charge current value of capacitor tank CET 510 may then be calculated, and the resulting value may be converted into battery current, taking into account the known conversion factor in U1 504.

Figure 7:
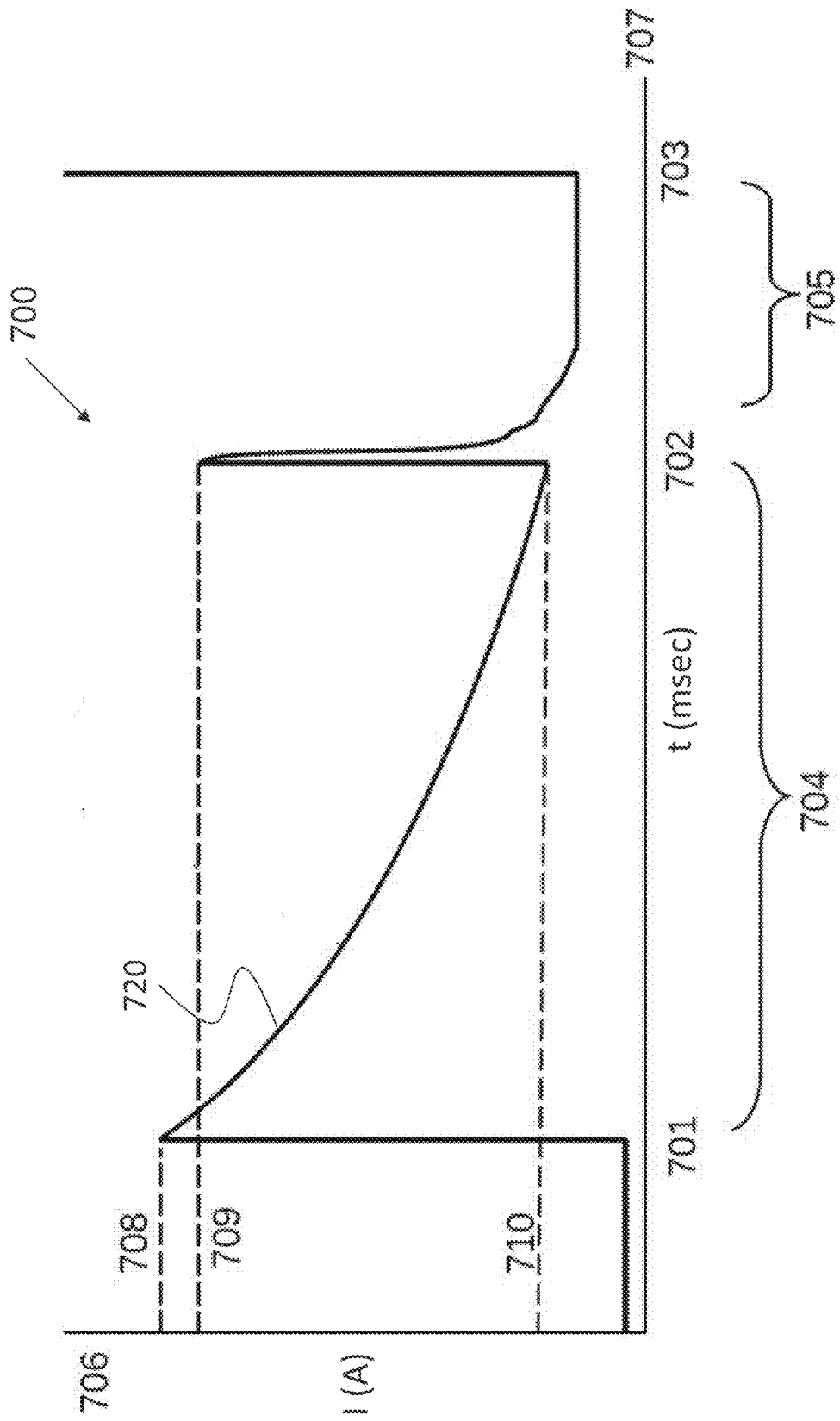
FIG. 7 is a graph showing an exemplary behavior of the battery current over time over the operation of the BPS from initial state up to and including powering on of the load, optionally when operating per the method shown in the flow chart of FIG. 3, according to an embodiment of the present invention.

Reference is now made to FIG. 7 which is a graph 700 of an exemplary behavior of the current 720 of BAT 102 during the turning on and powering of LOAD 114, optionally when operating per method 300, according to an embodiment of the present invention. Graph 700 plots BAT 102 output current I (current in amps A) on y-axis 706 vs. time t (time in msec) on x-axis 707. Until the point in time 701, BPS 100 and LOAD 114 may be in low power state (optionally sub-mA). At time 701, which may be associated with step 308, the discharged capacitor tank CT 110 is connected to the output of the current limiter, which is disabled (in current limiting state). This may result in an almost instantaneous rise in battery current 720 to the current limit 708 as shown. Battery current 720 may then decrease in accordance with the increase in the voltage of the capacitor tank CT 110 (as shown during time interval 704). The point in time 702 may be associated with step 318 wherein the current limiter CL 108 may be enabled and a second very short surge of battery current 720 may occur (due to low output impedance of VDC 104). The time interval 705 may be a stabilization (relaxation) delay associated with step 320. The point in time 703 may be associated with step 322 wherein LOAD 114 may be turned on and the battery current may rise sharply to the level of a LOAD 114 consumption.

It is noted that the value of first battery current surge 708, the value of battery current 710 at point of time 702, and the value of second battery current surge 709 may each be individually controllable. It is further noted that the value of first battery current surge 708 and the value of second battery current surge 709 may not equal and the specific values of these current surges may be determined experimentally to optimize the operation of the entire BPS as a whole. It is additionally noted that the time interval 705 may be controllable. It is noted that the time interval 704 is dependent on the capacity of CT 110 by design so that battery current 710 is not dependent upon the capacity of CT 110. As well, the second current surge value 709 is not dependent upon the real capacity of CT 110. It is noted that the time interval 705 refers more to the process of relaxation (or stabilization) of charge carriers (ions) in BAT 102 than to the process of voltage stabilization on a capacitor tank because the duration of this interval is much longer than the duration of the second surge of current and may be measured in the order of tens (or even hundreds) of milliseconds, which may correspond to the mobility of battery's chemistry charge carriers.

ADDITIONAL EXAMPLES

Example 1 concerns a battery power supply to power an intermittently operating load including a voltage downconverter configured to be serially connected to a battery and to output a voltage VOUT smaller than a battery voltage V1; a current limiter serially connected to the voltage downconverter and configured to provide a voltage drop in a current limiting mode, and to substantially provide a short circuit in a non-current limiting mode; a capacitor tank serially connected to the current limiter for providing a voltage V2 to the load, and configured to be charged to a voltage VCT which is less than VOUT when the current limiter is switched to the current limiting mode, and which is substantially equal to VOUT when the current limiter is switched to the non-current limiting mode; and a controller configured to switch the voltage downconverter between an off state and an on state, and the current limiter between the current limiting mode and the non-current limiting mode, responsive to intermittent power consumption requirements in the load.

Example 2 includes the subject matter of Example 1 and, optionally, the controller switches the voltage downconverter from the off state to the on state responsive to receiving a signal from a signal source external to the battery power supply.

Example 3 includes the subject matter of examples 1 and/or 2 and, optionally, the controller switches the voltage downconverter from the off state to the on state responsive to the battery voltage V1 being equal to or greater than a turn-on voltage VDCin of the downconverter.

Example 4 includes the subject matter of any one or more of the examples 1 to 3 and, optionally, the controller switches the current limiter from the current limiting mode to the non-current limiting mode upon sensing that VCT is equal to or exceeds a threshold voltage of VICL less than $V_{OUT}$.

Example 5 includes the subject matter of any one or more of the examples 1 to 4 and, optionally, the controller stores the value of VCT upon sensing that VCT is less than the threshold voltage VICL.

Example 6 includes the subject matter of any one or more of the examples 1 to 5 and, optionally, the controller activates the load responsive to the capacitor tank being charged to a voltage VCT substantially equal to V2.

Example 7 includes the subject matter of any one or more of the examples 1 to 6 and, optionally, the voltage VCT is substantially equal to V2 following a period of time after the current limiter is switched to the non-current limiting mode.

Example 8 includes the subject matter of any one or more of the examples 1 to 7 and, optionally, including a voltage regulator to supply regulated power to the controller.

Example 9 includes the subject matter of any one or more of the examples 1 to 8 and, optionally, the battery has a non-flat discharge curve and a relatively high internal resistance compared to batteries comprising flat discharge curves.

Example 10 includes the subject matter of any one or more of the examples 1 to 9 and, optionally, the battery includes one or more alkaline batteries.

Example 11 includes the subject matter of any one or more of the examples 1 to 10 and, optionally, the battery includes a flat discharge curve and a relatively low internal resistance.

Example 12 includes the subject matter of any one or more of the examples 1 to 11 and, optionally, wherein the battery includes one or more lithium or lithium-ion batteries.

Example 13 includes the subject matter of any one or more of the examples 1 to 12 and, optionally, the battery is integral to the battery power supply.

Example 14 includes the subject matter of any one or more of the examples 1 to 13 and, optionally, the intermittently operating load includes an IoT device.

Example 15 includes the subject matter of any one or more of the examples 1 to 14 and, optionally, the controller is external to the battery power supply.

Example 16 concerns a method of providing DC power from a battery to an intermittently operating load, the method including applying a voltage V1 from a battery to a serially connected voltage downconverter, the voltage downconverter configured to output a voltage VOUT smaller than V1; applying the voltage VOUT to a current limiter serially connected to the voltage downconverter, the current limiter configured to provide a voltage drop in a current limiting mode, and to substantially provide a short circuit in a non-current limiting mode; charging a capacitor tank serially connected to the current limiter for providing a voltage V2 to the load, the capacitor tank configured to be charged to a voltage VCT which is less than VOUT when the current limiter is switched to the current limiting mode, and which is substantially equal to VOUT when the current limiter is switched to the non-current limiting mode; and switching the voltage downconverter between an off state and an on state, and the current limiter between the current limiting mode and the non-current limiting mode, responsive to intermittent power consumption requirements in the load.

Example 17 includes the subject matter of example 16 and, optionally, switching the voltage downconverter from the off state to the on state responsive to the battery voltage V1 being equal to or greater than a turn-on voltage VDCin of the downconverter.

Example 18 includes the subject matter of any one or more of the examples 16 to 17 and, optionally, switching the current limiter from the current limiting mode to the non-current limiting mode upon sensing that VCT is equal to or exceeds a threshold voltage VICL less than $V_{OUT}$.

Example 19 includes the subject matter of any one or more of the examples 16 to 18 and, optionally, measuring the battery voltage V1.

Example 20 includes the subject matter of any one or more of the examples 16 to 19 and, optionally, measuring the capacitor tank voltage VCT.

Example 21 includes the subject matter of any one or more of the examples 16 to 20 and, optionally, storing the value of VCT when VCT is less than the threshold voltage VICL.

Example 22 includes the subject matter of any one or more of the examples 16 to 21 and, optionally, activating the load responsive to the capacitor tank being charged to a voltage VCT substantially equal to V2.

Example 23 includes the subject matter of any one or more of the examples 16 to 22 and, optionally, the voltage VCT is substantially equal to V2 following a period of time after the current limiter is switched to the non-current limiting mode.

Example 24 includes the subject matter of any one or more of the examples 16 to 23 and, optionally, the battery has a non-flat discharge curve and a relatively high internal resistance compared to batteries comprising flat discharge curves.

Example 25 includes the subject matter of any one or more of the examples 16 to 24 and, optionally, the battery includes one or more alkaline batteries.

Example 26 includes the subject matter of any one or more of the examples 16 to 25 and, optionally, the battery has a flat discharge curve and a relatively low internal resistance.

Example 27 includes the subject matter of any one or more of the examples 16 to 26 and, optionally, the battery includes one or more lithium or lithium-ion batteries.

Example 28 concerns a device configured to operate intermittently including a battery; and a battery power supply including a voltage downconverter configured to be serially connected to a battery and to output a voltage VOUT smaller than a battery voltage V1; a current limiter serially connected to the voltage downconverter and configured to provide a voltage drop in a current limiting mode, and to substantially provide a short circuit in a non-current limiting mode; a capacitor tank serially connected to the current limiter for providing a voltage V2 to the load, and configured to be charged to a voltage VCT which is less than VOUT when the current limiter is switched to the current limiting mode, and which is substantially equal to VOUT when the current limiter is switched to the non-current limiting mode; and a controller configured to switch the voltage downconverter between an off state and an on state, and the current limiter between the current limiting mode and the non-current limiting mode, responsive to intermittent power consumption requirements in the load.

Example 29 includes the subject matter of example 28 and, optionally, the device includes an IoT device.

Example 30 includes the subject matter of any one or more of the examples 28 to 29 and, optionally, the battery has a non-flat discharge curve and a relatively high internal resistance compared to batteries comprising flat discharge curves.

Example 31 includes the subject matter of any one or more of the examples 28 to 30 and, optionally, the battery includes one or more alkaline batteries.

Example 32 includes the subject matter of any one or more of the examples 28 to 31 and, optionally, the battery has a flat discharge curve and a relatively low internal resistance.

Example 33 includes the subject matter of any one or more of the examples 28 to 32 and, optionally, the battery includes one or more lithium or lithium-ion batteries.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein.

Any digital computer system, module and/or engine exemplified herein can be configured or otherwise programmed to implement a method disclosed herein, and to the extent that the system, module and/or engine is configured to implement such a method, it is within the scope and spirit of the disclosure. Once the system, module and/or engine are programmed to perform particular functions pursuant to computer readable and executable instructions from program software that implements a method disclosed herein, it in effect becomes a special purpose computer particular to embodiments of the method disclosed herein. The methods and/or processes disclosed herein may be implemented as a computer program product that may be tangibly embodied in an information carrier including, for example, in a non-transitory tangible computer-readable and/or non-transitory tangible machine-readable storage device. The computer program product may be directly loadable into an internal memory of a digital computer, comprising software code portions for performing the methods and/or processes as disclosed herein. The term "non-transitory" is used to exclude transitory, propagating signals, but to otherwise include any volatile or non-volatile computer memory technology suitable to the application. Additionally, or alternatively, the methods and/or processes disclosed herein may be implemented as a computer program that may be intangibly embodied by a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

These computer readable and executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable and executable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

Unless otherwise specified, the terms 'about' and/or 'close' with respect to a magnitude or a numerical value may imply to be within an inclusive range of −10% to +10% of the respective magnitude or value.

It should be noted that where an embodiment refers to a condition of "above a threshold", this should not be construed as excluding an embodiment referring to a condition of "equal or above a threshold". Analogously, where an embodiment refers to a condition "below a threshold", this should not to be construed as excluding an embodiment referring to a condition "equal or below a threshold". It is clear that should a condition be interpreted as being fulfilled if the value of a given parameter is above a threshold, then the same condition is considered as not being fulfilled if the value of the given parameter is equal or below the given threshold. Conversely, should a condition be interpreted as being fulfilled if the value of a given parameter is equal or above a threshold, then the same condition is considered as not being fulfilled if the value of the given parameter is below (and only below) the given threshold.

It should be understood that where the claims or specification refer to "a" or "an" element and/or feature, such reference is not to be construed as there being only one of that element. Hence, reference to "an element" or "at least one element" for instance may also encompass "one or more elements".

As used herein the term "configuring" and/or 'adapting' for an objective, or a variation thereof, implies using materials and/or components in a manner designed for and/or implemented and/or operable or operative to achieve the objective.

Unless otherwise stated or applicable, the use of the expression "and/or" between the last two members of a list of options for selection indicates that a selection of one or more of the listed options is appropriate and may be made, and may be used interchangeably with the expressions "at least one of the following", "any one of the following" or "one or more of the following", followed by a listing of the various options.

As used herein, the phrase "A,B,C, or any combination of the aforesaid" should be interpreted as meaning all of the following: (i) A or B or C or any combination of A, B, and C, (ii) at least one of A, B, and C; and (iii) A, and/or B and/or C. This concept is illustrated for three elements (i.e., A,B,C), but extends to fewer and greater numbers of elements (e.g., A, B, C, D, etc.).

It is noted that the terms "operable to" or "operative to" can encompass the meaning of the term "adapted or configured to". In other words, a machine "operable to" or "operative to" perform a task can in some embodiments, embrace a mere capability (e.g., "adapted") to perform the function and, in some other embodiments, a machine that is actually made (e.g., "configured") to perform the function.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 4, from 1 to 4, from 1 to 5, from 2 to 4, from 2 to 6, from 4 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It should be appreciated that combination of features disclosed in different embodiments are also included within the scope of the present inventions.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A battery power supply for providing power to an intermittently operating load, comprising:
 a voltage downconverter having an input and an output, said voltage downconverter input electrically connected in series to a battery and having at least two operating modes including a disabled mode and an enabled mode, said voltage downconverter being in the disabled mode or the enabled mode in accordance with a first control signal, when in the enabled mode said voltage downconverter is operative to generate an output voltage substantially less than that of the battery;
 a current limiter electrically connected in series to said voltage downconverter and operative to limit current flowing therethrough;
 a shunt electrically connected in parallel across said current limiter, said shunt being in either a closed or open state in accordance with a second control signal;
 a capacitor tank electrically connected to said current limiter and to the load;
 a controller configured to:
  during a time the load is disabled and unpowered, maintain an electrical disconnect between said battery and said capacitor tank by placing said voltage downconverter in the disabled state via said first control signal so as to prevent battery discharge due to capacitor tank parasitic self-discharge current;
  each time the load is to be powered on and at a time sufficiently in advance of expected operation of the load, place said voltage downconverter in the enabled mode whereby said voltage downconverter charges said capacitor tank via said current limiter while said shunt is in the open state, said capacitor tank charged in a controlled manner in accordance with a first charge current surge profile to a predetermined voltage less than 90% of the output voltage of said voltage downconverter;
  periodically measure the voltage on said capacitor tank and when the predetermined voltage on the capacitor tank is reached, place said shunt in the closed state to immediately further charge said capacitor tank to the output voltage of the voltage downconverter in accordance with a second charge current surge profile;
  enable the load via said third control signal only after the second charge current surge profile is complete;
  when the load is to be powered off, place said voltage downconverter in the disabled mode thereby again electrically disconnecting said battery from said capacitor tank to prevent battery discharge; and
  wherein the predetermined voltage, characteristics of the first charge current surge profile, and that of the second charge current surge profile are configured to aid in maximizing both battery capacity utilization and battery life.

2. The battery power supply according to claim 1, wherein the controller switches the voltage downconverter from the off disabled state to the en enabled state responsive to receiving a signal from a signal source external to the battery power supply.

3. The battery power supply according to claim 1, wherein the controller switches the shunt to the closed state upon sensing that the capacitor tank voltage is equal to or exceeds a threshold voltage of VICL, which is less than 90% of the output voltage of the voltage downconverter.

4. The battery power supply according to claim 1, wherein said controller is further operative to enable the load via the third control signal only after waiting a predetermined period of time that corresponds to a relaxation period associated with the battery to further aid in maximizing battery capacity utilization and battery life.

5. The battery power supply according to claim 1, wherein the controller enables the load responsive to the voltage VCT of the capacitor tank being charged to a voltage substantially equal to V2.

6. The battery power supply according to claim 1, further comprising a voltage regulator to supply regulated power to the controller.

7. The battery power supply according to claim 1, wherein the battery comprises a non-flat discharge curve and a relatively high internal resistance compared to batteries comprising flat discharge curves.

8. The battery power supply according to claim 1, wherein the battery comprises one or more alkaline batteries, one or more non-lithium batteries, one or more lithium batteries, or one or more lithium-ion batteries.

9. The battery power supply according to claim 1, wherein the battery comprises a flat discharge curve and a relatively low internal resistance.

10. The battery power supply according to claim 1, wherein the battery is integral to the battery power supply.

11. The battery power supply according to claim 1, wherein the intermittently operating load comprises an internet of things (IOT) device.

12. The battery power supply according to claim 1, wherein the predetermined voltage is approximately 90% of the output of said voltage downconverter.

13. The battery power supply according to claim 1, wherein the controller stores the value of the capacitor tank voltage upon sensing that the capacitor tank voltage is less than a threshold voltage VICL.

14. The battery power supply according to claim 13, wherein the the capacitor tank voltage is substantially equal to V2 following a period of time after the shunt is placed in the closed state.

15. A method of providing DC power from a battery to an intermittently operating load, the method comprising:
  electrically disconnecting the battery from a capacitor tank while the load is disabled and unpowered by placing a voltage downconverter in a disabled mode in accordance with a first control signal so as to prevent battery discharge due to capacitor tank parasitic self-discharge current;
  generating, via the voltage downconverter, an output voltage substantially less than that of the battery when the voltage downconverter is in an enabled mode in accordance with the first control signal, the input of the voltage downconverter electrically connected in series to the battery;
  limiting current flow to the battery via a current limiter electrically connected in series to the voltage downconverter;
  shunting the current limiter via a shunt electrically connected in parallel across the current limiter, the shunt being in either a closed or open state in accordance with a second control signal;
  each time the load is to be powered on and at a time sufficiently in advance of expected operation of the load, placing the voltage downconverter in the enabled mode to charge the capacitor tank via the current limiter while the shunt is in the open state;
  charging the capacitor tank being in a controlled manner in accordance with a first charge current surge profile to a predetermined voltage less than 90% of the output voltage of the voltage downconverter;
  periodically measuring the voltage on the capacitor tank and when the predetermined voltage on the capacitor tank is reached, placing the shunt in the closed state to immediately continue charging the capacitor tank in accordance with a second charge current surge profile;
  enabling the load via a third control signal only after the second charge current surge profile is complete; and
  wherein the predetermined voltage, characteristics of the first charge current surge profile, and that of the second charge current surge profile are configured to aid in maximizing battery capacity utilization and battery life.

16. The method according to claim 15, comprising switching the shunt to the closed state upon sensing that the capacitor tank voltage is equal to or exceeds a threshold voltage VICL less than 90% of the output voltage of the voltage downconverter.

17. The method according to claim 15, comprising measuring the battery voltage V1.

18. The method according to claim 15, comprising measuring the capacitor tank voltage VCT.

19. The method according to claim 15, comprising storing the value of the capacitor tank voltage when the capacitor tank voltage is less than a threshold voltage VICL.

20. The method according to claim 15, comprising enabling the load responsive to the voltage VCT of the capacitor tank being charged to a voltage substantially equal to V2.

21. The method according to claim 15, comprising switching the voltage downconverter from the disabled state to the enabled state responsive to receiving a signal from a signal source external to the battery power supply.

22. The method according to claim 15, further comprising enabling the load via the third control signal only after waiting a predetermined period of time that corresponds to a relaxation period associated with the battery to further aid in maximizing battery capacity utilization and battery life.

23. A battery power supply for providing power to an intermittently operating load, comprising:
  a voltage downconverter having an input and an output, said voltage downconverter input electrically connected in series to a battery and having at least two operating modes including a disabled mode and an enabled mode, said voltage downconverter being in the disabled mode or the enabled mode in accordance with a first control signal, when in the enabled mode said voltage downconverter is operative to generate an output voltage less than that of the battery;
  a current limiter electrically connected in series to said voltage downconverter and operative to limit current flowing therethrough;
  a shunt electrically connected in parallel across said current limiter, said shunt being in either a closed or open state in accordance with a second control signal;
  a capacitor tank electrically connected to said current limiter and to the load;
  a controller configured to:
    during a time the load is disabled and unpowered, maintain an electrical disconnect between said battery and said capacitor tank by placing said voltage downconverter in the disabled state via said first control signal so as to prevent battery discharge due to capacitor tank parasitic self-discharge current;
    each time the load is to be powered on and at a time sufficiently in advance of expected operation of the load, place said voltage downconverter in the enabled mode whereby said voltage downconverter charges said capacitor tank via said current limiter while said shunt is in the open state, said capacitor tank being charged in a controlled manner in accordance with a first charge current surge profile to a predetermined voltage less than the output voltage of said voltage downconverter;
    periodically measure the voltage on said capacitor tank and when the predetermined voltage on the capacitor tank is reached, place said shunt in the closed state to immediately further charge said capacitor tank to the output voltage of the voltage downconverter in accordance with a second charge current surge profile;

enable the load via a third control signal after waiting a predetermined period of time after placing said shunt in the closed state, said predetermined period of time corresponding to a relaxation period associated with the battery;

when the load is to be powered off, place said voltage downconverter in the disabled mode thereby again electrically disconnecting said battery from said capacitor tank to prevent battery discharge; and wherein the predetermined voltage, characteristics of the first charge current surge profile, and that of the second charge current surge profile, and the predetermined of time related to the relaxation period of the battery are all configured to aid in maximizing battery capacity utilization and battery life.

24. The device according to claim 23, wherein the battery comprises a non-flat discharge curve and a relatively high internal resistance compared to batteries comprising flat discharge curves.

25. The device according to claim 23, wherein the battery comprises a flat discharge curve and a relatively low internal resistance.

26. The device according to claim 23, wherein the the capacitor tank voltage is substantially equal to V2 following a period of time after the shunt is switched to the closed state.

* * * * *